No. 757,662. PATENTED APR. 19, 1904.
J. P. JUNKIN & A. ALEXANDER.
BELT FASTENER.
APPLICATION FILED MAY 29, 1903.
NO MODEL.

WITNESSES:

INVENTORS
John P. Junkin
and Arch Alexander
BY
Attorneys

No. 757,662. Patented April 19, 1904.

UNITED STATES PATENT OFFICE.

JOHN P. JUNKIN AND ARCH ALEXANDER, OF PHEBA, MISSISSIPPI.

BELT-FASTENER.

SPECIFICATION forming part of Letters Patent No. 757,662, dated April 19, 1904.

Application filed May 29, 1903. Serial No. 159,234. (No model.)

*To all whom it may concern:*

Be it known that we, JOHN P. JUNKIN and ARCH ALEXANDER, citizens of the United States, residing at Pheba, in the county of Clay and State of Mississippi, have invented new and useful Improvements in Belt-Fasteners; and we do hereby declare the following to be a full, clear, and exact description of the invention, such as will enable others skilled in the art to which it appertains to make and use the same.

The invention relates to improvements in belt-fasteners, and has for its object to provide a simple, inexpensive, and efficient belt-fastener adapted to readily receive the ends of a piece of ribbon, webbing, or any other belt material and capable of enabling the same to be readily adjusted to make a belt of the desired size.

With these and other objects in view the invention consists of the novel construction and arrangement of parts hereinafter described and shown and particularly pointed out in the claim hereto appended.

Figure 1:
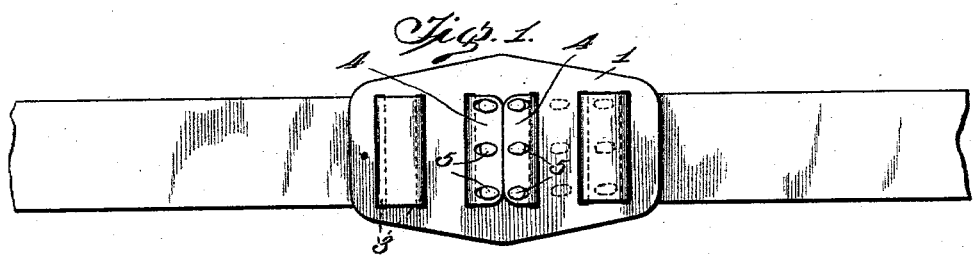
Figure 2:
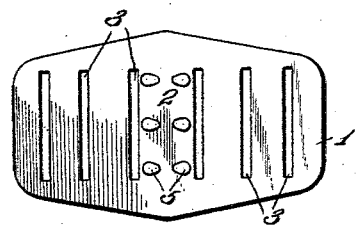
Figure 3:
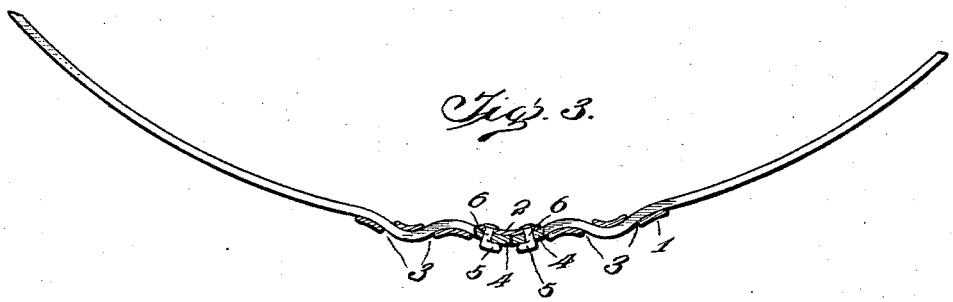

In the drawings forming part of this specification, and in which like numerals of reference designate corresponding parts, Figure 1 is a plan view of a belt-fastener constructed in accordance with this invention, illustrating the manner of securing the ends of a piece of a belt material, the dotted lines showing the size of the slots. Fig. 2 is a similar view, the belt material being removed. Fig. 3 is a longitudinal sectional view, the parts being arranged as shown in Fig. 1.

Referring to the drawings, 1 designates a plate constructed of steel or other suitable material and preferably tapered from the center to each end to present an ornamental appearance; but any other form of plate may be employed, as will be readily understood. The plate is provided with a central transversely-disposed solid portion or bar 2, and it has a series of slots 3, preferably three in number, arranged at regular intervals between the central solid portion or bar 2 and the ends of the plate to receive the terminal portions 4 of the belt material. The ends of the belt material are laced through the transversely-disposed slots or openings 3 and are secured by fastening devices 5, mounted on the central solid portion or bar 2. The slots or openings 3 are arranged parallel with one another, as clearly shown in Fig. 2, and are of a width equal to the width of the belt material.

The fastening devices 5 are provided with approximately L-shaped heads and have reduced shanks 6, which are secured in perforations of the central solid portions or bar 2, being preferably headed at the inner face of the plate, as indicated in Fig. 3 of the drawings. The L-shaped heads form approximately hook-shaped portions for engaging the ends of the belt material, and they provide inner opposite recesses into which the belt material is drawn, and the strain on the belt effectually prevents the belt material from becoming accidentally disengaged from the fastening devices.

The ends of the belt material are perforated to receive the fastening devices which extend through the perforations.

It will be seen that the belt-fastener is exceedingly simple and inexpensive in construction, that it is adapted to enable the ends of a piece of belt material to be readily connected, and that it will permit such belt material to be readily adjusted to provide a belt of the desired size.

We desire it to be understood that various changes in the form, proportion, and minor details of construction within the scope of the appended claim may be made without departing from the spirit or sacrificing any of the advantages of the invention, as we may desire to vary the construction of the fastening devices for securing the ends of the belt material of the plate.

What we claim is—

A belt-fastener comprising a plate provided with a series of slots or openings at each end to receive the end portions of a piece of belt material, and the oppositely-disposed fastening devices mounted on the central portion of the plate, and having approximately L-shaped engaging heads forming inner recesses and adapted to engage the ends of a belt, substantially as described.

In testimony whereof we have hereto affixed our signatures in the presence of two witnesses.

JOHN P. JUNKIN.
ARCH ALEXANDER.

Witnesses:
J. P. VALENTINE,
C. W. CHAMPIN.